US012615243B2

(12) United States Patent
Chen Kaidi et al.

(10) Patent No.: US 12,615,243 B2
(45) Date of Patent: Apr. 28, 2026

(54) STREAMLINED AND PRIVACY PROTECTED DATA FLOWS FOR ENTITY ONBOARDING WITH ONLINE DATA PLATFORMS

(71) Applicant: PAYPAL, INC., San Jose, CA (US)

(72) Inventors: George Chen Kaidi, Singapore (SG);
Bipin Kesapur, Singapore (SG);
Sreeram Vasudevan, Singapore (SG);
Rajasekaran Radhakrishnan, Chennai (IN)

(73) Assignee: PAYPAL, INC., San Jose, CA (US)

( * ) Notice: Subject to any disclaimer, the term of this patent is extended or adjusted under 35 U.S.C. 154(b) by 844 days.

(21) Appl. No.: 17/891,953

(22) Filed: Aug. 19, 2022

(65) Prior Publication Data

US 2024/0064132 A1 Feb. 22, 2024

(51) Int. Cl.
*H04L 9/40* (2022.01)
(52) U.S. Cl.
CPC .................................. *H04L 63/062* (2013.01)
(58) Field of Classification Search
None
See application file for complete search history.

(56) References Cited

U.S. PATENT DOCUMENTS

2021/0248624 A1* 8/2021 Keren .................. G06Q 50/184
2022/0351156 A1* 11/2022 Ghorbani ............... G06Q 20/02
2023/0342838 A1* 10/2023 Ho ..................... G06Q 30/0643

* cited by examiner

*Primary Examiner* — Laura Yesildag
(74) *Attorney, Agent, or Firm* — Haynes and Boone, LLP

(57) ABSTRACT
There are provided systems and methods for streamlined and privacy protected data flows for entity onboarding with online data platforms. An online transaction processor or other service provider may provide computing services and platforms to entities including merchants for electronic transaction processing and other account services. To onboard entities with the transaction processor, the transaction processor may provide a multistep system that includes allowing entities to specify particular needs of input/output mechanisms, configure interface buttons having a wrapper layer, and submit feedback on error logs. The transaction processor may also provide a masking service to detect, mask, and notify the entity of sensitive data exposures during onboarding and usage of merchant systems. Additionally, the transaction processor may provide a sandbox environment for the entity to test different accounts having different permissions. A blockchain and distributed records may be used to validate an identity of the entity.

20 Claims, 6 Drawing Sheets

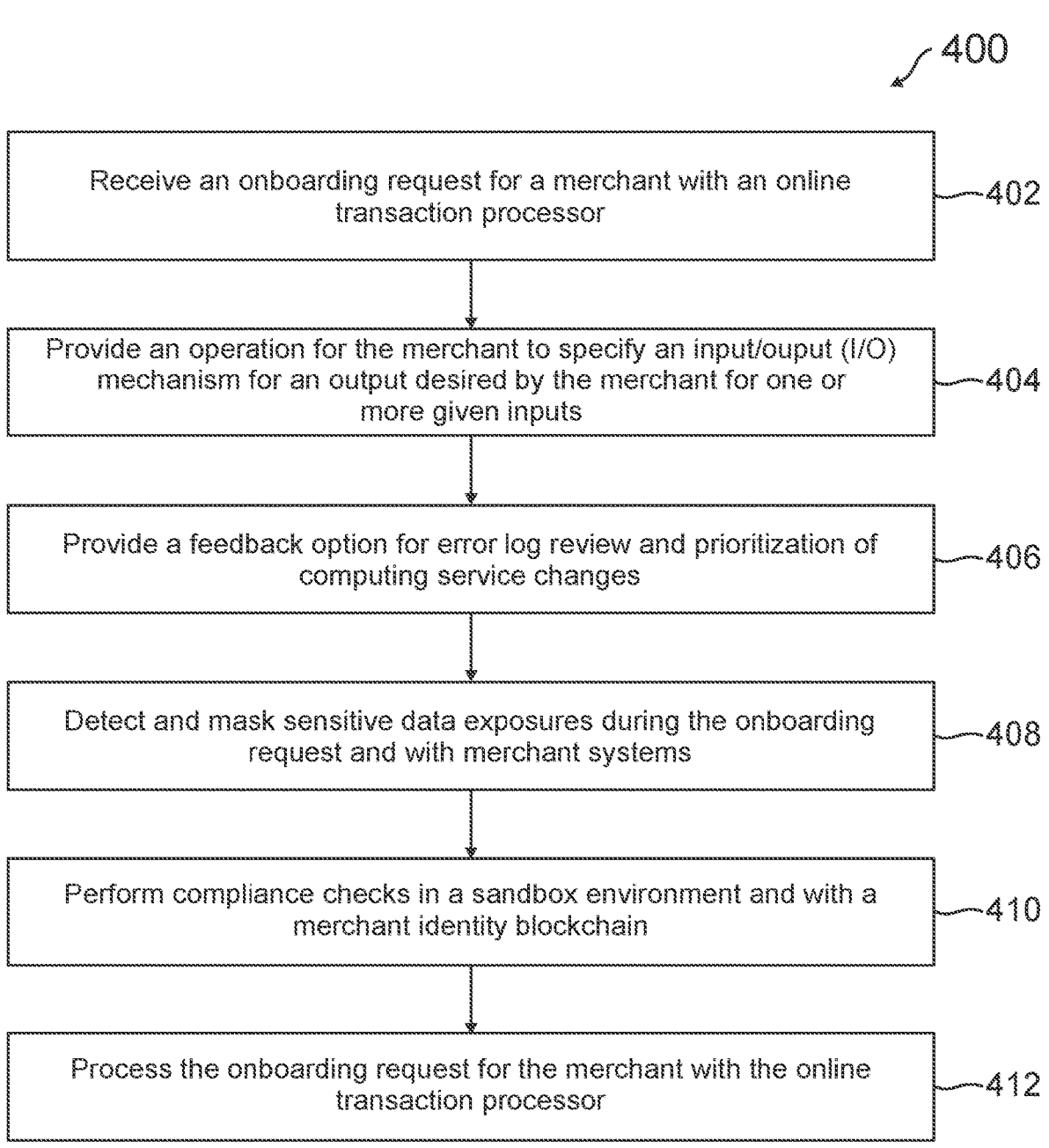

400

Receive an onboarding request for a merchant with an online transaction processor —402

Provide an operation for the merchant to specify an input/ouput (I/O) mechanism for an output desired by the merchant for one or more given inputs —404

Provide a feedback option for error log review and prioritization of computing service changes —406

Detect and mask sensitive data exposures during the onboarding request and with merchant systems —408

Perform compliance checks in a sandbox environment and with a merchant identity blockchain —410

Process the onboarding request for the merchant with the online transaction processor —412

FIG. 4

STREAMLINED AND PRIVACY PROTECTED DATA FLOWS FOR ENTITY ONBOARDING WITH ONLINE DATA PLATFORMS

TECHNICAL FIELD

The present application generally relates to data privacy and security when utilizing online platforms, and more particularly to providing streamlined and privacy protected data flows to onboard entities with an online data service provider and their platforms.

BACKGROUND

Online service providers may offer various services to end users, merchants, and other entities. This may include providing electronic transaction processing data flows, services, and other computing resources. Further, the service provider may provide and/or facilitate the use of online merchant marketplaces and/or transaction processing between different entities. However, establishment and use of these digital services require merchants and other entities to onboard with the service providers. During onboarding operations, services may not be streamlined and/or protected to prevent data leaks and/or cause unnecessary data input and/or processing operations. The difficulties of properly onboarding such merchants and other entities may lead to loss of customer reliance and/or attrition. Thus, there is a need to provide a more streamlined, faster, and more secure process to onboard digital data and services for merchants with an online merchant marketplace platform.

BRIEF DESCRIPTION OF THE DRAWINGS

FIG. 4 is a flowchart for streamlined and privacy protected data flows for entity onboarding with online data platforms, according to an embodiment.

Figure 1:
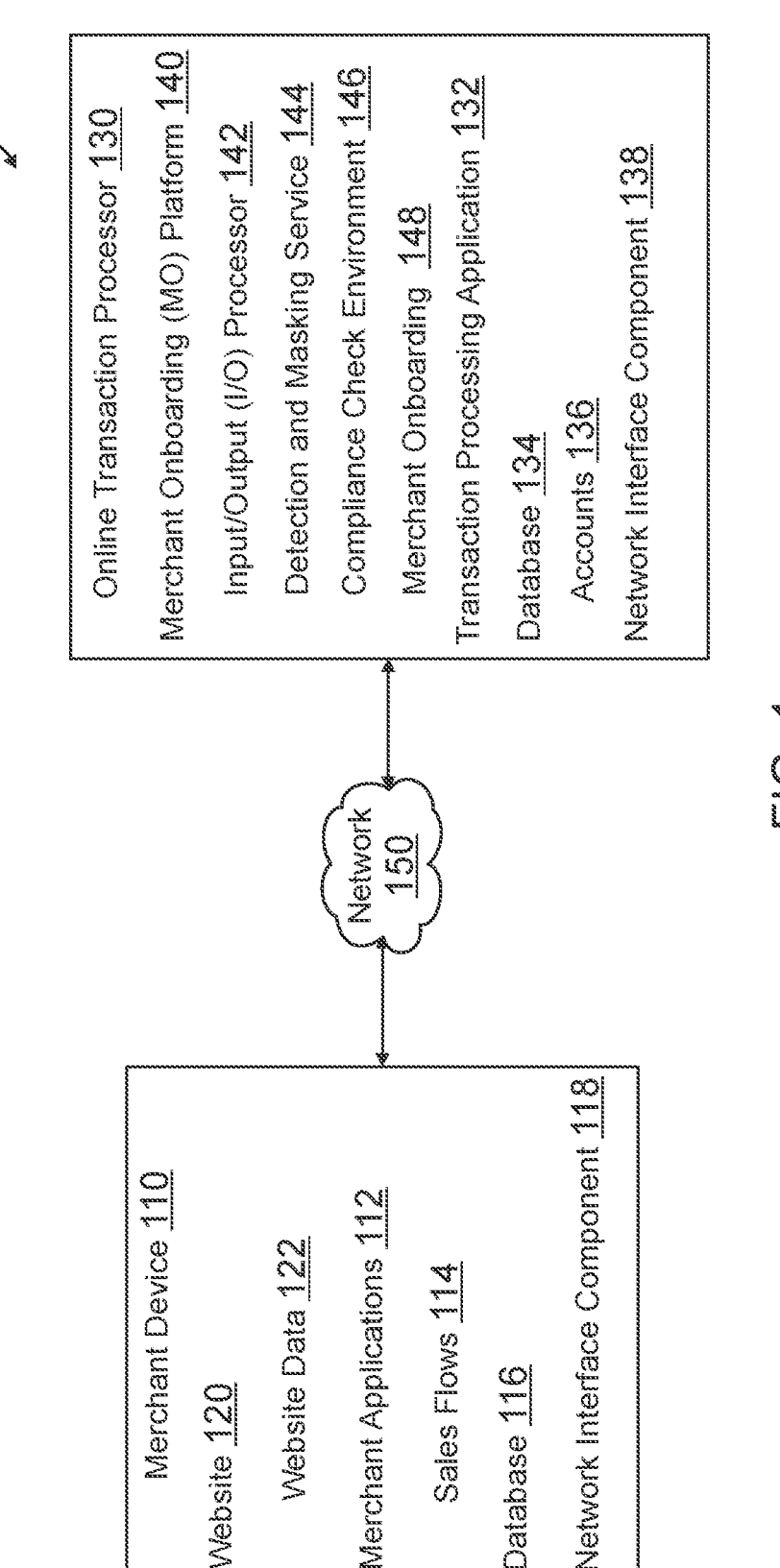
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for streamlined and privacy protected data flows for entity onboarding with online data platforms. Systems suitable for practicing methods of the present disclosure are also provided.

A user may wish to process a transaction, such as for a payment to another user or a transfer, through an online service provider. The user may pay for one or more transactions using a digital wallet or other account with the online service provider or transaction processor (e.g., PayPal®). An account may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information. The account and/or digital wallet may be loaded with funds or funds may otherwise be added to the account or digital wallet. The application or website of the service provider, such as PayPal® or other online payment provider, may provide payments and the other transaction processing services via the account and/or digital wallet.

Once the account and/or digital wallet of the user is established, the user may utilize the account via one or more computing devices, such as a personal computer, tablet computer, mobile smart phone, or the like. The user may engage in one or more transactions with a recipient, such as a merchant account or digital wallet that may receive an amount of a payment during electronic transaction processing between the user and the merchant (e.g., via a merchant website, application, point-of-sale (POS) device, or the like). Prior to engaging in these interactions, the service provider may be required to onboard the merchant and setup merchant payment and transaction processing operations and procedures through one or more merchant websites, systems, applications, devices, and the like.

When accessing online platforms and utilizing the corresponding computing resources, merchants may onboard to provide their corresponding services. The merchant onboarding experience is often a time consuming and difficult process requiring many data inputs, uploads, computing service setups (including software development kit (SDK) usage and setup, application and/or website setup and configuration, and the like. Thus, there are many valid reasons causing merchants to drop off from a service provider's onboarding platform, account setup, and/or computing service usage. Gaps from integration, complex workflows, processes that create unhappiness from merchants in using our products and services may all lead to loss of merchant onboarding and/or difficulty with the experience.

Generally, three main difficulties arise during onboarding. First, there may be an unfriendly merchant experience. For example, through the redirects and overlays, there are problems that arise that cause a service provider to have customer dropouts and/or merchant difficulties based on redirecting users and/or merchants away from a website, interface, data processing flow, or the like. The service provider may also want to provide an in-context experience with a latest SDK implementation, which may not provide operations and redirects for interface-specific and/or tightly controlled interface elements, such as interface buttons that may be controlled by specific data processing policies and operations (e.g., a smart payment button that may streamline payment processes but have corresponding compliance and policy requirements). Further, the service provider may be requesting too large of an amount of information that may be unnecessary for onboarding compliance.

Second, there may also be data exposure issues that allow an attacker to transfer funds into attacker's other merchant account. A bad actor may initiate a computing attack on the computing environment of the service provider, such as an eavesdropping attack, a password attack and/or account takeover, a web abuse (e.g., account enumeration, brute force attacks, SQL injection), or other type of computing attack that may compromise electronic communications, such as exposing data contained in the electronic communications to the bad actor. Exposure of sensitive data may lead to fraud and loss during account takeovers, fraudulent electronic transaction processing, access and/or performing online banking and/or account and fund balance management, and the like.

Third, complexities during onboarding of merchants may include a lack of a clean computing and platform environment (i.e., due to compliance requirements), toggling of various restrictions, and checks on data entry and submission. This causes merchants to be confused about integration(s) that should be used by specific merchants and/or requirements for computing services. These online platforms and interfaces may also have broken links and/or dead links based on merchant data input and unused processes. This may require a personal assistant or manager to assist the merchant or other entity during onboard. When moving from Simple Object Access Protocol (SOAP) endpoints to representational state transfer (REST) endpoints, a merchant may be required to upgrade and update internal computing systems, which may be required by compliance implementations. Thus, these may cause failures in onboarding and usage of service provider systems, especially where regional requirements (e.g., EU restrictions) may be implemented with merchant and/or electronic transaction processing.

In various embodiments, an online transaction processor or other service provider may make the merchant experience onboarding more friendly. For example, the service provider may provide resources based on merchant requirements that are key to helping shape products and services provided to merchants during onboarding. An input-output (i/o) mechanism may be provided where merchants can specify the output that they want, along with what supporting inputs the merchant or users would be able to provide for that output. The i/o mechanism may be manually input by the merchant or other entity (e.g., by specifying input code and expected output), via one or more user interfaces, and/or through selections in menus and other data input mechanisms. The i/o mechanism may determine if, given those inputs, the requested output (in form, format, or function) may be generated dynamically. Requests may then be generated dynamically by gathering and ranking the demand for each i/o pair and/or request and determine a prioritization of each. Thereafter, the service provider may build broad-based methods that support those requests, such as through engineers, coders, data scientists, and other means.

For example, if there are merchants requesting an operation to change the shape and size of a checkout button, then functions may be built to enable that change, and future requests for that change may be automatically handled by providing such an i/o pair. A smart payment button may be provided that automatically enables payments to be made through a pop-out or pop-up window, as well as a window within another interface. However, because of the rigidity of this button required by the backend operations, compliance and regulatory requirements, policies, and the like, the service provider may add a wrapper layer before this smart payment button mechanism that the merchants may control for usage with webpages and/or software application usage. This wrapper layer may be hooked onto the i/o mechanism where merchants may be provided with options to specify what the merchants want the button to do and/or how the button may behave. The wrapper layer may then implement those changes as it wraps around the corresponding interface button to deliver the corresponding computing experience. However, if a build is not supported, the build may be added into the general queue and be ranked according to similar demand for engineering.

Feedback may also be used to enhance merchant experiences. Instead of asking merchants directly, inferences may be determined from errors generated from merchant and customer platforms. An "Error Feedback" option may be utilized with merchants, whereby once enabled, the service provider may capture and forward a copy of merchant and customer errors logs, stripped of sensitive data, back to the service provider. Based on the errors received, the service provider may perform a series of analytics. This may include first classifying the errors into various error families/types, assessing the impact of those errors with merchant onboarding, computing systems, customer experiences, and the like, and thereafter prioritizing those that cause drop-offs or abandoned transactions when the onboarding and/or computing services are used.

The service provider may also provide operations to protect from sensitive data exposure. For example, the service provider may implement a masking operation based on patterns when sensitive data is exposed (e.g., when performing console printing, logging of data, entry to a public data field, communication logs and/or transmissions, etc.). The masking operation may utilize call per instance method to create a sample masking, such as: [routes.gateway] [get./gateway]: Gateway details: {merchantId": "z8kjgjzj8cscxmgm", "publicKey": "*vgfz", "privateKey": "*" }. A three-part service may be implemented where a detection service may be provided to merchants during onboarding or later setup using an SDK and application programming interfaces (APIs). This may implement, in the merchant's systems, websites, and/or applications, a new service that continuously scans parent and/or child webpages of the merchant's website(s) for any potential revelations of hidden secrets during data processing that resembles the service provider encryption, data, and/or private keys, as well as other sensitive data (e.g., financial or other account identifiers and information, authentication credentials, personally identifiable information (PII), medical information, information a user or an entity specifies as not to be shared publicly, etc.). For instance, a service provider API key might be 22-characters long and utilize lower-case characters. Upon detection of the same or similar keys in webpage and/or data transmissions, a notification may be sent to both the service provider and the merchant to review. Scanning and detection may utilize key and/or sensitive data fingerprints or other similarity information, and may look for similar patterns, partial data revelations, and the like.

Apart from real-time scans, such as for every 100 callbacks (or 4 hours, whichever may be earlier or later based on a threshold that may be configurable by the merchant and/or service provider) made to the service provider's computing service, there also may a retrospective scan whereby the service provider may trigger a return-callback to validate the integrity of the merchant platform to check that services are running correctly and that no secrets are exposed. A masking service may then be implemented where, should there be any triggers from the above detection service, the masking service may apply an auto-masking of the sensitive data. If the exposed secrets are not able to be controlled by the service provider, a notification may be sent to the merchant, and a restriction may be placed on the usage of such exposed secrets. For example, any anomalous activities may trigger a break in the computing service until the key or other exposed secret is rotated out or otherwise controlled and prevented from usage or exposure by the merchant. Thereafter, a masking manager may be implemented to allow controls to the merchant. This manager service may allow for the exposed secrets to be cached within the service provider's data logs and records, which may be identified by the merchants. The merchant may then submit a request to the masking manager to have those entries removed when not needed to be masked and/or no longer exposed or in use. The masking manager may automatically create a new rule to identify those secrets that are exposed and add their identification, fingerprint, and the like into the capabilities of the detection service.

In order to provide further streamlined onboarding, a merchant may be provided a sandbox computing environment. For a sandbox environment, a merchant may be provided with access to and/or use of two or more different accounts. For example, the merchant may be provided with a regular account with capabilities similar to live accounts for onboarding and verification requirements, as well as a privileged account with all approved onboarding and verification requirements. This may allow the merchant to test payment operations more simply and efficiently. For the live computing and/or production environment, there may also be provided a digital identity for merchants. For each merchant and digital identity, the service provider may host the identity of a merchant including business, stakeholders, and users on a blockchain. Each financial institution that is verifying the merchant for any use case (e.g., credit risk, anti-money laundering risk, etc.) may put a transaction on the blockchain to verify or otherwise record information for the merchant. The blockchain may then be used to determine a number of sources and/or past blockchain records that may verify (or report as fraudulent) the merchant's identity. The more the number of sources that may approve and/or authenticate the merchant's identity, the better the score may be for that merchant identity. Financial institutions may then benefit from this distributed identity of merchants.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a merchant device 110 and an online transaction processor 130 in communication over a network 150. Merchant device 110 may be utilized by a merchant or other user to receive communications over network 150, where online transaction processor 130 may provide various data, operations, and other functions over network 150 to provide services to merchants, users, and computing devices. In this regard, merchant device 110 may be used to onboard with online transaction processor 130. Online transaction processor 130 may provide streamlined and data privacy protected operations for onboarding data flows and operations, as discussed herein.

Merchant device 110 and online transaction processor 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Merchant device 110 may be implemented as a communication device that may utilize appropriate hardware and software configured for wired and/or wireless communication with online transaction processor 130. For example, in one embodiment, merchant device 110 may be implemented as a personal computer (PC), a smart phone, laptop/tablet computer, wristwatch with appropriate computer hardware resources, eyeglasses with appropriate computer hardware (e.g., GOOGLE GLASS @), other type of wearable computing device, implantable communication devices, and/or other types of computing devices capable of transmitting and/or receiving data. Although only one device is shown, a plurality of devices may function similarly and/or be connected to provide the functionalities described herein.

Merchant device 110 of FIG. 1 is able to access or control a website 120 and includes merchant applications 112, a database 116, and a network interface component 118. Website 120 and merchant applications 112 may correspond to executable processes, procedures, and/or applications with associated hardware. In other embodiments, merchant device 110 may include additional or different modules having specialized hardware and/or software as required.

Website 120 may be operated, hosted, updated, and provided to end user devices and other systems or servers using one or more processes to execute software modules and associated components of merchant device 110. Website 120 may correspond to a hosted website having webpages that may include parent and child webpages that host website data 122 that includes data, operations, fields, web applications, and the like and may be used by customers and service providers to browse items and other services provided by a corresponding merchant, engage in electronic transaction processing, provide customer support and feedback, and the like. Website 120 may be provided through one or more webpages having of Hypertext Markup Language (HTML) code, Extensible Markup Language (XML) code, JavaScript code, or Cascading Style Sheets (CSS). Website data 122 of website 120 may correspond to such code, layouts, and protocols, which may be required during onboarding of the corresponding merchant with online transaction processor 130.

Website data 122 may also include data for installed and/or configured SDKs and SDK operations, APIs and endpoints, and the like. In this regard, website data 122 for website 120 may be used to determine and streamline onboarding operations, such as by determining website capabilities and website layouts for use in provided a streamlined onboarding experience. Website data 122 may further be updated when the merchant is onboarded in order to provide capabilities of online transaction processor 130 with website 120 (e.g., payment functionalities, as well as other integrated operations and/or SDKs). Further, website data 122 may be used by one or more detection services for sensitive data exposure, and thereafter any sensitive data exposures may be masked by online transaction processor 130.

Merchant applications 112 may correspond to one or more processes to execute software modules and associated components of merchant device 110 to provide features, services, and other operations by a merchant for consumers over network 150, which may include merchant sales operations, POS device processing and/or operations, online merchant marketplaces, sales and inventory services, and the like. Further, merchant applications 112 may enable requesting and onboarding with online transaction processor 130 for use of payment and/or electronic transaction processing services provided for sales flows 114 including merchant sales, inventory, return or exchange, risk analysis, and other computing services. In this regard, merchant applications 112 may correspond to specialized software utilized by a merchant or other user of merchant device 110 that may provide applications and application data via website 120 or another user interface for sales flows 114 that may include the computing services enabled by online transaction processor 130 after merchant onboarding. Merchant applications 112 may provide and/or process items for sale with merchant device 110 and/or a user interacting with merchant device 110 (e.g., using a POS device, website 120, mobile application, or another merchant marketplace platform. In certain embodiments, merchant applications 112 may be accessible over the Internet and provide for sales with merchant device 110 over network 150.

Sales flows 114 of merchant applications 112 may also correspond to a checkout application at a physical merchant location, such as the application(s) of a point-of-sale (POS) device used to provide sales at physical locations. Sales flows 114 of merchant applications 112 may be used to establish a transaction once a user/employee associated with merchant device 110 has selected one or more items for purchase and/or entered the item(s) to the transaction for processing. Once a payment amount is determined for the item(s) to be purchased by the user, sales flows 114 may request payment for the transaction. Payment may be provided using electronic transaction processing services enabled and/or provided by online transaction processor 130 after merchant onboarding using the streamlined and data privacy protected processing flows discussed herein. In this regard, payment may be received from a user and may be processed using online transaction processor 130. After receipt of payment and/or confirmation of the payment, sales flows 114 may then process a payment to the merchant associated with merchant device 110.

In various embodiments, merchant applications 112 may correspond to a general browser application configured to retrieve, present, and communicate information over the Internet (e.g., utilize resources on the World Wide Web) or a private network. For example, merchant applications 112 may provide a web browser, which may send and receive information over network 150, including retrieving website information (e.g., a website for an email provider or other messaging service), presenting the website information to the user, and/or communicating information to the website. However, in other embodiments, merchant applications 112 may include a dedicated application provided by online transaction processor 130 or other entity (e.g., an email provider or messaging service), as well as services and/or online digital platforms hosted by such entities. Merchant applications 112 may be associated with digital payment accounts, account information, user financial information, and/or transaction histories, which may be associated with electronic transaction processing services provided by online transaction processor 130 for merchants. In further embodiments, different services may be provided via merchant applications 112, including social networking, media posting or sharing, microblogging, data browsing and searching, online shopping, and other services available through online transaction processor 130.

Merchant device 110 may further include a database 116 stored on a transitory and/or non-transitory memory of merchant device 110, which may store various applications and data and be utilized during execution of various modules of merchant device 110. Database 116 may include, for example, identifiers such as operating system registry entries, cookies associated with merchant applications 112 and/or other applications, identifiers associated with hardware of merchant device 110, or other appropriate identifiers, such as identifiers used for payment/user/device authentication or identification, which may be communicated as identifying the user/merchant device 110 to online transaction processor 130. Moreover, database 116 may store website data 122 and/or data for sales flows 114, as well as other data utilized for merchant onboarding with online transaction processor 130.

Merchant device 110 includes at least one network interface component 118 adapted to communicate with online transaction processor 130 and/or other devices and servers. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Online transaction processor 130 may be maintained, for example, by an online service provider, which may provide computing services and operations via one or more digital platforms, applications, websites, and the like. Online transaction processor 130 may provide computing services to various entities, which may require onboarding. In one example, online transaction processor 130 may be provided by PAYPAL®, Inc. of San Jose, CA, USA. However, in other embodiments, online transaction processor 130 may be maintained by or include another type of service provider.

Online transaction processor 130 of FIG. 1 includes a merchant onboarding (MO) platform 140, a transaction processing application 132, a database 134, and a network interface component 138. MO platform 140 and transaction processing application 132 may correspond to executable processes, procedures, and/or applications with associated hardware. In other embodiments, online transaction processor 130 may include additional or different modules having specialized hardware and/or software as required.

MO platform 140 may correspond to one or more processes to execute modules and associated specialized hardware of online transaction processor 130 to provide streamlined and data privacy protected data flows during onboarding of merchants with online data platforms. In this regard, MO platform 140 may correspond to specialized hardware and/or software used by a merchant or other user associated with merchant device 110 to provide operations during onboarding of a merchant for computing service usage with online transaction processor 130, as well as maintenance of such services over time. For example, MO platform 140 may receive a merchant onboarding request in order to enroll in a merchant account and/or access and utilize computing resources provided by online transaction processor 130. Based on this request, MO platform 140 may provide an input/output (i/o) processor 142, a detection and masking service 144, a compliance check environment 146, and/or other computing resources, services, and/or data. Thereafter, MO platform 140 may process a merchant onboarding 148 for each merchant request, which may include creating and/or processing accounts and account data, providing SDKs and API endpoints for system integrations, protecting and masking sensitive data exposures, and/or providing compliance checks for merchant identities. Merchant onboarding 148 may therefore include one or more operations to provide the above services and determine merchant eligibility for usage of computing services (e.g., electronic transaction processing services) provided by online transaction processor 130.

For example, i/o processor 142 may be used by a merchant to specifically request a particular output, such as an output of an operation, decision, node processing, and/or result of authentication, electronic transaction processing, navigation, account services, risk analysis, or the like, based on one or more inputs and/or data loads. This may be used for merchants to specify the particular executables and commands that may be implemented within one or more merchant systems, websites, and/or applications. Further, the requests for i/o processor 142 may be prioritized and/or ranked based on a number and/or number of requests for such outputs, as well as based on the same or similar inputs. Engineers may then be provided the i/o pairs and the corresponding prioritization in order to generate solutions that may be rolled out to merchants to resolve such requests.

I/o processor 142 may also provide a smart payment button encapsulated in a wrapper layer, where the wrapper layer is configurable and hooked to an i/o mechanism of i/o processor 142 in order for merchants to specify the shape, appearance, behavior, and/or operations of the smart payment button. For example, the wrapper layer may allow for i/o processor 142 to change display configurations and/or embedding of the smart payment button. The wrapper layer may also enable the merchant to specify certain API calls or other calls and requests to be executed before and/or during the smart payment button's operations with online transaction processor 130 for simplified payment flows. This may allow the merchant to make inventory calls, shipping fee calculations, customer service requests, or the like prior to or during usage of the smart payment button. I/o processor 142 may also implement one or more feedback mechanisms that may analyze merchant error logs that are scrubbed of merchant, customer, and/or sensitive data (e.g., financial, PII, or similar data). Based on a recurrence and/or impact of those errors, such as causing drop-offs or abandoned transactions, engineers or other means may be employed to resolve such errors. These errors may therefore be captured and forwarded to i/o processor 142 in a copy the merchant and customer errors logs. Based on the errors received, i/o processor 142 may perform a series of analysis on the logs, classify into families and types, assess the impact, and prioritize based on one or more rules.

Detection and masking service 144 may further provide operations during merchant onboarding and maintenance or servicing for masking private data that may be revealed from data calls, data entry, and/or computing attacks. For example, an initial detection service may be implemented using an SDK or other available code packages, code snippets, executable operations, and the like in one or more operations of the merchant's systems, such as website 120 and/or merchant applications 112 of merchant device 110. A detection service may be utilized to detect, such as through similarities, machine learning (ML) models, rule-based engines, key fingerprints, and the like, exposures of sensitive data through one or more logs, data transmissions or communications, data input fields, compromised computing systems, and the like. These may include exposures of private keys and other sensitive data. Thereafter, a masking service may be implemented to automatically trigger and mask those sensitive data exposures. A masking manager may further be used to log the masking of sensitive data and allow merchant to unmask and/or delete records of sensitive data, such as when the exposure has been resolved and/or the exposed data is no longer used or at issue. The operations of detection and masking service 144 are discussed in further detail with regard to FIG. 2.

Further, during merchant onboarding requests, compliance check environment 146 may be provided to merchants and/or utilized in order to verify merchants and provide merchant background identity confirmation. For example, compliance check environment 146 may include a sandbox computing environment where a merchant may choose and test between two or more accounts. One account may correspond to a regular account that may utilize live onboarding and/or verification requirements for merchants. The other account may correspond to a privileged account that allows all approved onboarding options and operations to be utilized, where merchants may test payment options. This may allow merchants to view onboarding flows and data entry and verification requirements, while the other account may allow the merchants to test available payment and electronic transaction processing operations from online transaction processor 130, such as those through transaction processing application 132.

Further, compliance check environment 146 may include a blockchain verification system of merchant identities. Verified and/or authorized financial institutions may be provided with access and writing rights for blockchain records that may be persisted to a blockchain available to compliance check environment 146. This blockchain may include blockchain records for past merchant verifications, identifications, authentications, and/or other validity checks that may confirm and merchant's identity and verify their positive transactional status, or otherwise indicate as fraudulent. The blockchain may be persisted over a disparate set of machines or devices and maintained to preserve tampering. Thereafter, the records may be used to verify a merchant's identity and/or determine if the merchant qualifies for certain financial services. This may be based on a number, quality, and/or threshold of blockchain records and/or their corresponding scores. The operations for blockchain merchant verification of compliance check environment 146 are discussed in further detail with regard to FIGS. 3A and 3B.

Transaction processing application 132 may correspond to one or more processes to execute modules and associated specialized hardware of online transaction processor 130 to process a transaction, including purchases and/or sales provided through website 120 and/or merchant applications 112 of merchant device 110. In this regard, transaction processing application 132 may correspond to specialized hardware and/or software used by a merchant associated with merchant device 110 to establish a payment account with transaction processing application 132 by providing merchant and/or financial information to online transaction processor 130. The account may be used to send and receive payments, including those payments that may be enabled through website 120 and/or merchant applications 112 after merchant onboarding. The merchant payment account may be accessed and/or used through a browser application and/or dedicated payment application executed by merchant device 110, such a payment and/or digital wallet application. Transaction processing application 132 may process payments and may provide transaction histories to merchant device 110 and/or another user's device or account for transaction authorization, approval, or denial of the transaction for placement and/or release of the funds, including transfer of the funds between accounts.

In various embodiments, online transaction processor 130 includes other applications as may be desired in particular embodiments to provide features to online transaction processor 130. For example, the other applications may include security applications for implementing server-side security features, programmatic client applications for interfacing with appropriate APIs over network 150, or other types of applications. The other applications may contain software programs, executable by a processor, including one or more GUIs and the like, configured to provide an interface to the user when accessing online transaction processor 130, where the user or other users may interact with the GUI to more easily view and communicate information. In various embodiments, the other applications may include additional connection and/or communication applications, which may be utilized to communicate information over network 150.

Additionally, online transaction processor 130 includes database 134. Database 134 may store various identifiers associated with merchant device 110 and/or secondary device 140. Database 134 may also store account data, including payment instruments, financial information, account balances, and authentication credentials, as well as transaction processing histories and data for processed transactions. Database 134 may include information used during merchant onboarding, such as website data 122, sales flows 114, and/or other merchant input and data for use in merchant onboarding. Database 134 may store information or other data generated and stored by MO platform 140, transaction processing application 132, and/or the other applications of online transaction processor 130. Database 134 may also include onboarded merchant accounts, preferences, and/or established merchant payment and electronic transaction processing flows.

In various embodiments, online transaction processor 130 includes at least one network interface component 138 adapted to communicate merchant device 110 and/or other devices and servers over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
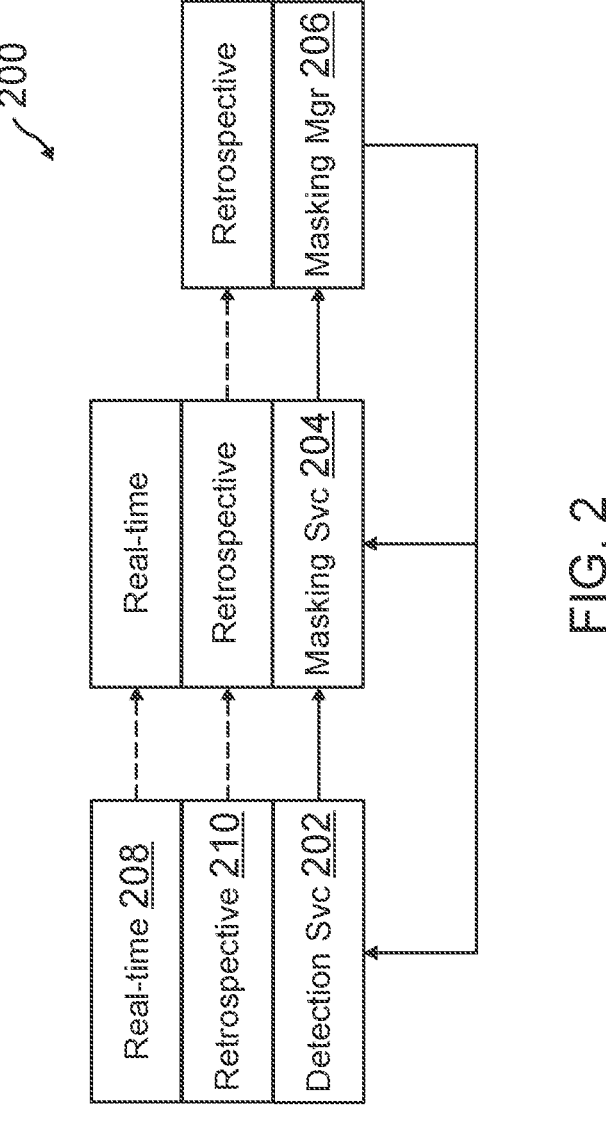
FIG. 2 is an exemplary diagram of a three-part solution for protecting sensitive data exposures during merchant onboarding and sensitive data uses with merchant systems, according to an embodiment.

FIG. 2 is an exemplary diagram 200 of a three-part solution for protecting sensitive data exposures during merchant onboarding and sensitive data uses with merchant systems, according to an embodiment. Diagram 200 includes operations for detection and masking of sensitive data exposures by merchant device 110 when utilizing services provided by online transaction processor 130 discussed in reference to system 100 of FIG. 1. Further, diagram 200 may be performed by detection and masking service 144 discussed in reference to system 100 in order to provide such operations.

In diagram 200, a detection service 202, a masking service 204, and a masking manager 206 may be used in order to provide detection and masking services of sensitive data exposures, such as private keys, financial data, authentication credentials, and the like, when potentially made available through logs, public fields, and the like for merchant systems. This may be done through a three-part system, which may provide detection service 202, masking service 204, and masking manager 206. Such operations may be provided through an SDK or other available operation that may be incorporated in and/or executed by the systems, websites, and/or applications of the merchant. Detection service 202 and masking service 204 may each use real-time data and be performed in real-time 208, while detection service 202, masking service 204, and masking manager 206 may each use retrospective data and be performed in retrospective time 210.

For detection service 202 in real-time 208, with provided packages and options for SDKs and APIs, such as application, process, code, endpoint, and other packages, the online transaction processor may enable and provide a service that continuously or periodically scans the parent and child webpages of one or more websites for any secrets, sensitive data, financial information, authentication credentials, or the like that resembles keys or other data of the online transaction processor. This may be done using one or more fingerprints and/or fingerprint databases that may include similar key or data structures. When detected, a notification may be transmitted to the merchant by detection service 202 to allow the merchant to interact with and/or log and resolve a corresponding sensitive data exposure. The notification may also be transmitted to and/or populated within an interface of a detection system for the online transaction processor for masking and resolution.

For example, during deployment and rendering of detection service 202, detection service 202 may analyze the merchant's code/pages statically and dynamically to determine if private keys or other sensitive data has been logged, printed, exposed, or otherwise revealed. Certain complex strings (e.g., combination of upper and lower case, and/or symbols and/or numbers) may be flagged as well in order to identify obscure and/or encrypted resolutions. Further, entry of sensitive data may occur incidentally by users, such as when a password is typed into a public field (e.g., a username field where the password is not hidden). Thus, the detection field may be implemented on complex strings in public fields and/or other areas, and in particular when a subsequent request containing a similar payload follows from the initial request (e.g., if a user typed their password into username field by mistake in first try, but the second type may follow very quickly in succession).

During such occasions, it may be highly likely a password is exposed. For detection service 202 in retrospective time 210, apart from real-time scans, for every X callbacks, X hours, a threshold of X callbacks/hours, or a combination made to detection service 202, a retrospective scan may be performed to ensure validity and integrity of the merchant platform. If an endpoint is over-exposing data and/or a problematic endpoint that has multiple data exposures, a notification may be provided to the merchant and/or transaction processor. Further, if there are anomalous usages of the same or similar secret keys or other sensitive data, such as being used by a foreign application or unknown IP address, detection service 202 may trigger a call to initiate the generation and initializing of a new dynamic key or other sensitive data to prevent the abuse of the exposed data.

For masking service 204, if there are triggers from detection service 202, masking service 204 may be implemented to apply an auto-masking of the sensitive data exposure and other uses and/or exposures of the sensitive data across websites, applications, systems, and/or platforms of the merchant. For example, via the SDK, and in real-time or near real-time if needed, the sensitive data may be made gibberish, obscured, encrypted, or otherwise hidden within logs and other data records and transmissions. If the exposed secrets may not be controllable by the online transaction processor, a notification may be provided to the merchant. Further, a restriction may be placed on the usage of such sensitive data so that when a detected anomalous activity occurs, the sensitive data, such as private keys, may be rotated, ended, frozen from use, or otherwise prevented from malicious abuse. This may include replacing characters with \*\*\*, or partial masking where parts of the string may be masked.

If there is any ambiguity, masking service 204 may default to mask the entries first and then send the entries to masking manager 206, which may be a module, code, system, or person, for processing, such as queuing for manual review. The manual review may assist the auto-masking service to improve accuracy. For masking manager 206, exposed secrets may be cached and/or stored with their corresponding logs and records that may be identifiable by merchants. Merchants may then submit a request to masking manager 206 to have those entries removed for various reasons and/or requirements. Masking manager 206 may then automatically create a rule to identify the same or similar requirements for blocking or allowing certain private key or other sensitive data exposure, which may then update fingerprints and records for detection service 202 and masking service 204. Masking manager 206 may further utilize rules and/or ML models to consider and reduce possible impact that may occur if the corresponding keys or other sensitive data were to be masked and/or exposed.

Figure 3A:
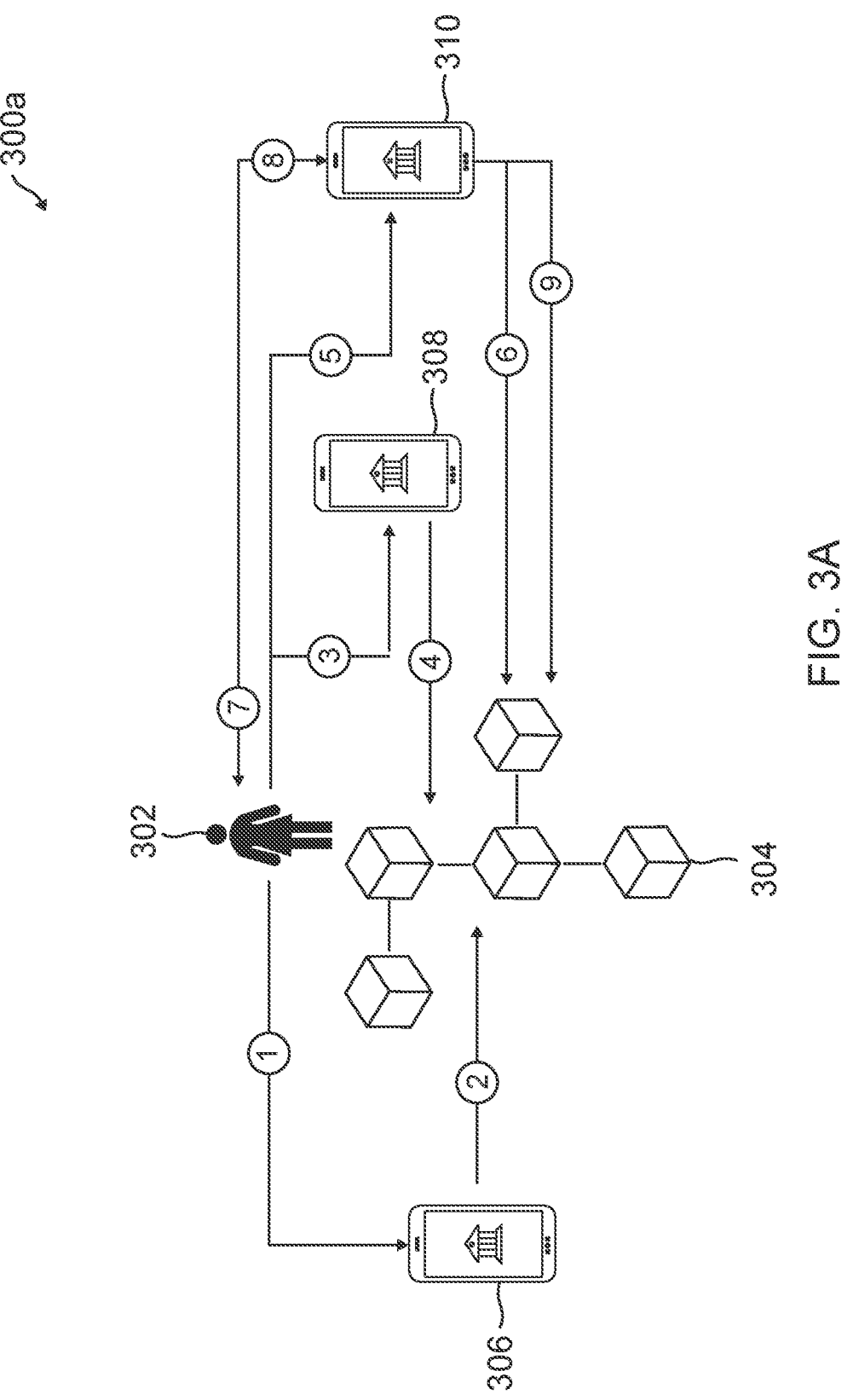
FIG. 3A is an exemplary diagram of system environment for utilizing a blockchain-based merchant verification system, according to an embodiment.

FIG. 3A is an exemplary diagram 300*a* of system environment for utilizing a blockchain-based merchant verification system, according to an embodiment. Diagram 300*a* includes a merchant 302 utilizing a digital identity blockchain 304 that may be used to record and verify a merchant identity using blockchain records persisted over a distributed network of devices, servers, and the like. In this regard, merchant 302 may utilize a computing device, such as merchant device 110, that may interact with the digital identity blockchain 304 that is provided by a transaction processor that has or is being onboarded the merchant, such as one or more servers, devices, and/or components of online transaction processor 130, where merchant device 110 and online transaction processor 130 are discussed in reference to system 100 of FIG. 1. Diagram 300*a* further includes a financial institution 306, a financial institution 308, and a financial institution 310 that may utilize digital identity blockchain 304 to validate the identity of merchant 302 when providing financial services and the like.

In diagram 300*a*, merchant 302 may onboard with the online transaction processor and establish an identity and/or verification of the merchant's data, validity, nonfraudulent behavior, or the like. For example, merchant 302 may provide a merchant identifier, know your customer (KYC) information (e.g., name, address, merchant or user documents (passport, national identifier, social security number, etc.), an employer identification number (EIN) or other tax information, or other identification information. This may include information that identifies the merchant on digital identity blockchain 304, such as the business, owner or employer, stakeholder(s), and other user associated with merchant 304.

In this regard, in a first use case showing a first type of onboarding of merchant 302 for digital identity blockchain 304 may include an activity 1 and an activity 2 where merchant 302 is new to the online transaction processor and digital identity blockchain 304. During activity 1, merchant 302 applies for a product or service and/or onboards with the online transaction processor, which requires KYC or other merchant information, which is provided to financial institution 306 that is associated with the online transaction processor and digital identity blockchain 304. Thereafter, during activity 2, the online transaction processor stores the KYC data or other records in a distributed record on digital identity blockchain 304.

In a second use case, merchant 302 is a new customer with financial institution 308, but an existing customer with the online transaction processor and/or another financial institution so that merchant 302 has records on digital identity blockchain 304. In an activity 3, merchant 302 applies for a product or service with financial institution 308 that requires KYC or other merchant information. Thereafter, at an activity 4, financial institution 308 fetches the identity and other details for validating the identity from digital identity blockchain 304 in order to complete the KYC or other merchant information. Further, financial institution 308 may record an interaction or other positive or negative merchant identity feedback to another distributed record on digital identity blockchain 304.

In a third use case, merchant 302 has an update scenario of the digital identity for merchant 302 and on digital identity blockchain 304. During an activity 5, merchant 302 applies for a higher product/service or product/service that requires more extensive identity checks and/or higher scores, such as for a product/service with the online transaction processor or financial institution 310. For example, online payment providers may trigger an enhanced KYC requirement. At an activity 6, financial institution 310 checks digital identity blockchain 304 and retrieves records, but determines additional data is required from merchant 302. At an activity 7, financial institution 310 requests such information from merchant 302, which is submitted during an activity 8. Thereafter, financial institution 310 and/or the online transaction processor may update digital identity blockchain 304 with an additional record for the updated information.

Using digital identity blockchain 304, each financial institution, such as financial institutions 306-310, may verify merchant 304 for different financial services and/or use cases. For example, financial institutions may verify merchant 302 for credit risk, anti-money laundering risk, credit and/or loans, account services, fraud and remittance services, and the like. The financial instruments may request a transaction to verify the identity of merchant 302 on digital identity blockchain 304, where the higher the number of sources approving and/or authenticating the authenticity of the user's identity, the better or higher the score of the identity and/or verification is for merchant 302. Similarly, if there are bad or fraudulent records on the blockchain noting bad, fraudulent, or malicious merchant behavior or actions, the score for the identity of merchant 302 may be lowered.

Figure 3B:
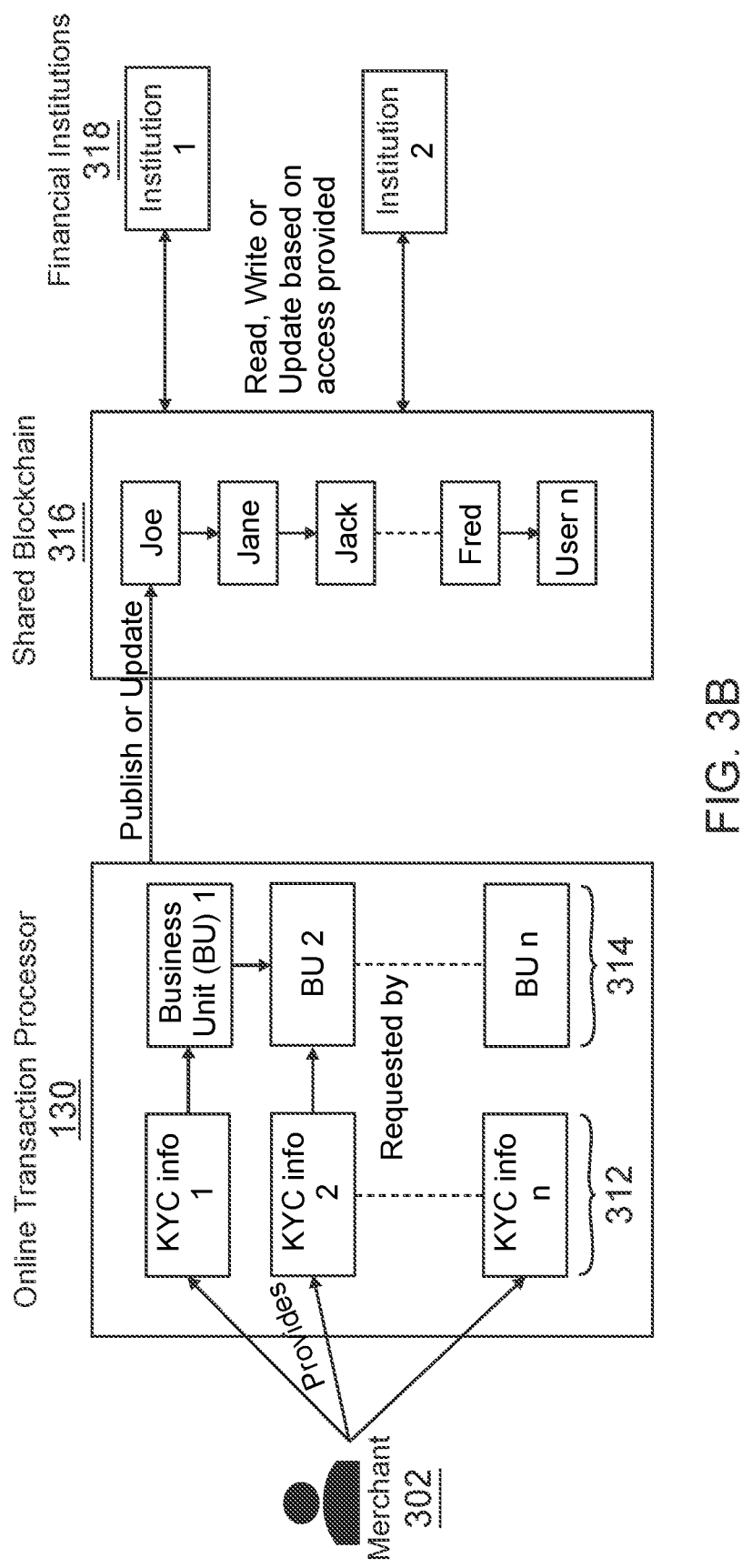
FIG. 3B is an exemplary diagram of interactions for writing records to a blockchain used for merchant verification based on merchant identity information, according to an embodiment.

FIG. 3B is an exemplary diagram 300*b* of interactions for writing records to a blockchain used for merchant verification based on merchant identity information, according to an embodiment. Merchant 302 is shown in diagram 300*b* providing information that is verified and recorded to a record in a blockchain, such as digital identity blockchain 304, where merchant 302 and digital identity blockchain 304 are discussed in reference to diagram 300*a* of FIG. 3A. In this regard, online transaction processor 130 from system 100 of FIG. 1 is shown receiving and validating the information before recording to the blockchain.

Merchant 302 initially provides KYC information 312, which may correspond to different portions of KYC information that may be requested by different ones of business units (BUs) 314. Each of BUs 314 may request different portions, types, or amounts of KYC information 312, such as based on different requirements, compliance checks, regional laws and/or regulations, business rules or policies, and the like. Online transaction processor 130 may further validate such information in order to verify the identity of merchant 302 and/or provide a computing or financial service to merchant 302. For example, online transaction processor 130 may provide services for digital accounts, electronic transaction processing, merchant platform integrations, and the like.

Online transaction processor 130 may then publish or update the identity of merchant 302 with a shared blockchain 316. Shared blockchain 316 is shown with the digital identities of different users, merchants, or the like, which may correspond to one or more blockchain records from a distributed blockchain network of devices, servers, and other computing nodes. Shared blockchain 316 may include or be controlled by permissions, where entities that can publish and write to shared blockchain 316 may be limited to online transaction processor 130 and financial institutions 318. This may prevent malicious or fraudulent users, merchants, or other entities from writing false, invalid, or fraudulent records that may either increase (e.g., positive KYC, information, or activities that are false) or decrease (negative KYC, information, or activities that are false) a score for merchant 302 or other users and/or merchants recorded in shared blockchain 316. Thus, financial institutions 318 may be provided access to read, write, or update on shared blockchain 316 based on access provided to financial institutions 318.

FIG. 4 is a flowchart 400 for streamlined and privacy protected data flows for entity onboarding with online data platforms, according to an embodiment. Note that one or more steps, processes, and methods described herein of flowchart 400 may be omitted, performed in a different sequence, or combined as desired or appropriate.

At step 402 of flowchart 400, an onboarding request for a merchant with an online transaction processor is received. The onboarding request may be from a user, merchant, or other entity that requests usage of computing services, including accounts, online platforms, applications, data processing services, and the like that are provided by the online transaction processor or other online service provider. For example, the online transaction processor may provide electronic transaction processing and other digital financial services to merchants, which requires onboarding and proof of identity, merchant data security, and integration of computing services with the merchant's computing systems and platforms. At step 404, an operation is provided for the merchant to specify an i/o mechanism for an output desired by the merchant for one or more given inputs. For example, the merchant or other entity may specify a desired output of an operation that may be provided by the online transaction processor, including a specific usage of an interface button (e.g., a smart payment button) including performing certain data calls, requests, and/or fetches prior to or after using the interface button. The merchant may then further specify one or more inputs for the desired inputs, which may be used for the online transaction processor to engineer the i/o mechanism.

At step 406, a feedback option is provided for error log review and prioritization of computing service changes. The feedback option may review error logs for errors that occur during onboarding of the merchant or other entity, as well as those that result from the use of the online transaction processor's computing services. This may allow for identification and prioritization of computing service changes to resolve such errors in computing logs. Further, based on the number or volume of request for the i/o mechanism or other computing service change and/or the number or cause of the errors associated with computing service change, prioritization of those changes for engineering and providing to the merchant or other merchants/entities may be adjusted in a queue for engineering and resolution tasks.

At step 408, sensitive data exposures are detected and masked during the onboarding request and with merchant systems. Computing logs, interfaces, interface fields or other data entry operations, database records, and the like may be analyzed to determine if all or part of a private key or other sensitive data may be exposed. This may be based on the same or similar key or sensitive data structure. For example, a fingerprint database and/or key or sensitive data fingerprints may be used to identify sensitive data exposures. This may be done through a detection service, which may be performed in real-time or retroactively. A masking service may then be used to automatically mask the sensitive data exposures and transmit a notification to the merchant of the exposures. Further, a masking manager may be used to unmask data, identify exposed data in order to invalidate or remove the data from use, and/or otherwise adjust the masking and/or exposed data.

At step 410, compliance checks are performed in a sandbox environment and with a merchant identity blockchain. A sandbox environment may be provided where merchants and/or other entities may test different accounts, such as an account with regular or initial account services and a fully unlocked merchant account that allows sandboxed usage of extensive computing services provided by the online transaction processor. Further, a digital identity blockchain may record distributed records of merchant or entity KYC information that have been validated and/or provided and used by one or more financial institutions. This may allow for verification of the merchant's or other entity's identity, where the records may be trusted by being limited to writing, recording, and/or updating on the blockchain to trusted service providers, financial institutions, and/or the online transaction processor. At step 412, the onboarding request is processed for the merchant with the online transaction processor. This may include verifying the received information, providing the requested computing services including the engineered i/o mechanism, and/or masking data for the merchant.

Figure 5:
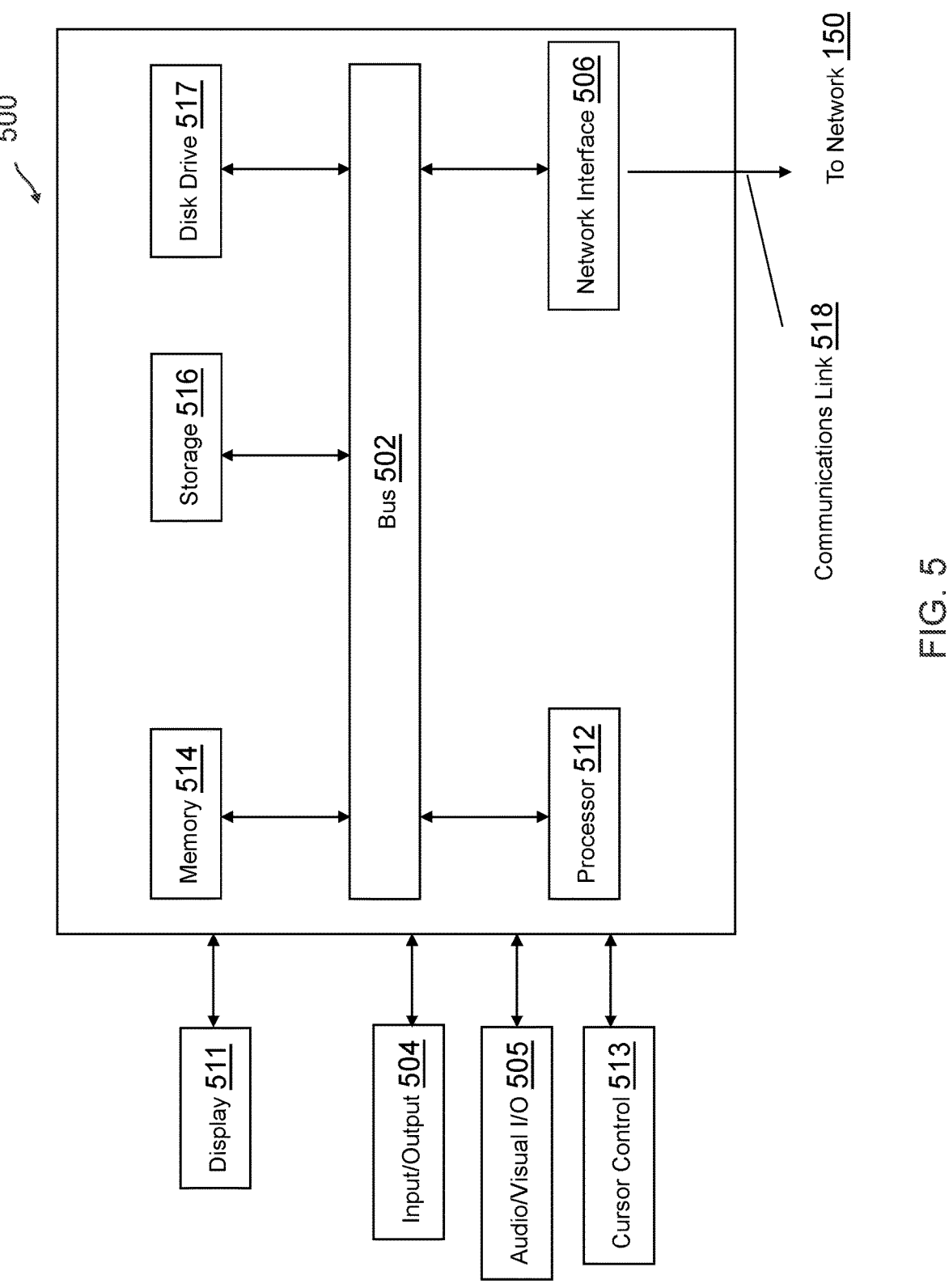
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output component 505 may also be included to allow a user to use voice for inputting information by converting audio signals and/or use video to capture still or video images and provide video input. Audio I/O component 505 may allow the user to hear audio and/or view video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:

a non-transitory memory; and one or more hardware processors coupled to the non-transitory memory and configured to read instructions from the non-transitory memory to cause the service provider system to perform operations comprising:

detecting a first entity onboarding request of a first entity with the service provider system;

providing, with the first entity onboarding request, an operation for the first entity to provide an input/output (i/o) pair for an option available to the first entity, wherein the i/o pair comprises at least one specified data input by the first entity for a corresponding data output based on the at least one specified data input;

implementing a detection service for private key masking with the first entity during a processing of the first entity onboarding request, wherein the implementing comprises:

scanning, by the detection service of the service provider system, a website of the first entity for an exposure of a private key via one or more webpage logs or one or more public fields for the website, masking, by a masking service of the service provider system, the private key on the website based on the scanning, wherein the masking service is automatically triggered in response to detecting the exposure of the private key from the scanning the website;

performing a compliance check of a digital platform provided by a computer system associated with the first entity for the first entity onboarding request;

processing the first entity onboarding request based at least on the operation, the detection service, and the compliance check;

integrating the operation with the computer system that provides the digital platform over a network, wherein the integrating the operation enables the computer system to execute the operation in association with providing the digital platform over the network; identifying, using the detection service, a data exposure associated with the operation by the computer system; and configuring the detection service with a masking rule for the private key masking based on the data exposure.

2. The service provider system of claim 1, wherein the i/o pair comprises an interface button having a wrapper computing layer added that is controllable by the first entity on a website of the first entity.

3. The service provider system of claim 2, wherein the wrapper computing layer allows for a specification by the first entity for an additional computing call to be executed prior to usage of the interface button with the first entity on the service provider system.

4. The service provider system of claim 1, wherein the providing the operation comprises:

analyzing one or more error logs associated with the operation;

determining a prioritization of the operation based on the one or more error logs; and generating the operation for the i/o pair based on the one or more error logs and the prioritization.

5. The service provider system of claim 1, wherein the implementing the detection service comprises:

providing, via a masking manager of the service provider system, an option to unmask the private key on the website.

6. The service provider system of claim 5, wherein the detection service utilizes a plurality of private key fingerprints during the scanning of the website for the exposure of the private key.

7. The service provider system of claim 1, wherein the operations further comprise: notifying the first entity of the masking by the masking service.

8. The service provider system of claim 7, wherein the detection service, the masking service, and the masking manager are provided via a software development kit (SDK) for the service provider system to the first entity implemented with the website.

9. The service provider system of claim 5, wherein the performing the compliance check of the first entity for the first entity onboarding request comprises:

accessing a blockchain having a plurality of blockchain records, wherein at least one of the plurality of blockchain records is associated with a past history of the first entity with a second entity; and verifying the first entity using the blockchain.

10. The service provider system of claim 1, wherein the operations further comprise:

providing a sandbox testing environment to the first entity for testing accounts of the first entity for the service provider system, wherein the sandbox testing environment enables different access levels for the accounts of the first entity.

11. A method comprising:

receiving a request to onboard an entity with a payment provider system for electronic transaction processing;

requesting a pairing for an input and an output for an option available for the electronic transaction processing;

scanning, by a detection service of the payment provider system, one or more webpages of the entity for a private key exposure of a private key via one or more webpage logs or one or more public fields for the one or more webpages, wherein the one or more webpages are provided by a computer system of the entity over a network;

masking, by a masking service of the payment provider system, the private key on the one or more webpages based on the scanning, wherein the masking service is automatically triggered in response to detecting the private key exposure of the private key by the detection service;

masking, by the masking service, a sensitive data exposure from the one or more webpages of the entity utilized for the electronic transaction processing, wherein the one or more webpages are provided by a computer system of the entity over a network;

providing a compliance environment to the entity for testing a compliance requirement of the entity for the electronic transaction processing;

processing the request to onboard the entity based on the pairing, the one or more webpages having the masked sensitive data exposure, and the compliance environment, wherein the processing includes integrating the option for the one or more webpages with the computer system to provide the option in association with the one or more webpages over the network based on the input and the output paired;

executing a scan of the computer system at a time after the option has been integrated;

identifying a data exposure associated with the option by the computer system based on the scan; and configuring the computer system to utilize a masking rule that masks data associated with the data exposure when providing the option in association with the one or more webpages.

12. The method of claim 11, further comprising:

notifying the entity of the sensitive data exposure and the masking, wherein the notifying identifies at least one of the one or more webpages having the sensitive data exposure.

13. The method of claim 11, further comprising, prior to the masking:

scanning the one or more webpages for the sensitive data exposure based on a private key fingerprint for a private key exposed by the sensitive data exposure; and checking public fields on the one or more webpages for the sensitive data exposure.

14. The method of claim 11, further comprising:

providing, to the entity, a masking manager to remove the masking of the sensitive data exposure on the one or more webpages.

15. The method of claim 11, wherein the compliance environment comprises a sandbox testing environment for a plurality of accounts having different account access levels usable with the electronic transaction processing.

16. The method of claim 11, wherein the compliance environment comprises a blockchain verification system for historical records of at least the entity recorded by registered entity institutions to a blockchain.

17. The method of claim 11, further comprising:

updating a queue for the pairing of the input and the output based on number of entity requests for the pairing of the input and the output for the option.

18. The method of claim 17, wherein the pairing in the queue is prioritized based on a failure of the option when implemented by at least the entity for the electronic transaction processing.

19. A non-transitory machine-readable medium having stored thereon machine-readable instructions executable to cause a machine to perform operations comprising:

receiving a request to onboard an entity with an online processor system for data processing services, wherein the request comprises an input/output (i/o) mechanism for a payment button for the data processing services;

monitoring a plurality of webpages provided by a computer system of the entity, wherein the plurality of webpages are used for the data processing services, and wherein the plurality of webpages are monitored for an exposure of a private key utilized by the entity during the data processing services, and wherein the monitoring comprises:

scanning, by a detection service of the online processor system, the plurality of webpages of the entity for the exposure of the private key via one or more webpage logs or one or more public fields associated with the plurality of webpages;

masking, by a masking service of the online processor system, the private key when used by the plurality of webpages based on the scanning, wherein the masking service is automatically triggered in response to detecting the exposure of the private key from the scanning, by the detection service, the plurality of webpages;

performing a compliance check of the entity for the data processing services;

onboarding the entity with the online processor system based on the request, the monitoring, and the compliance check, wherein the onboarding integrates the payment button with the plurality of webpages over a network using the i/o mechanism;

executing a scan of the computer system at a time after the payment button has been integrated;

identifying that the i/o mechanism for the payment button exposes the private key; and configuring the computer system to execute a masking rule for the i/o mechanism based on the identifying.

20. The non-transitory machine-readable medium of claim 19, wherein the monitoring comprises performing, using a detection service, a scan of a parent webpage and at least one child webpage from the plurality of webpages for at least a portion of the private key, and wherein the operations further comprise:

providing, for the plurality of webpages of the entity, a masking service that automatically masks the exposure of the private key from the plurality of webpages and a masking manager that allows removal of masking of the exposure of the private key.

\* \* \* \* \*